United States Patent [19]
Kang et al.

[11] Patent Number: 5,327,256
[45] Date of Patent: Jul. 5, 1994

[54] RESOLUTION CONVERSION METHOD OF PICTORIAL IMAGE PROCESSING SYSTEM

[75] Inventors: Ku-Su Kang, Seoul; Seo-Kyu Kim, Kyounggi, both of Rep. of Korea

[73] Assignee: SamSung Electronics Co., Ltd., Suwon, Rep. of Korea

[21] Appl. No.: 814,614

[22] Filed: Dec. 30, 1991

[30] Foreign Application Priority Data

Dec. 7, 1991 [KR] Rep. of Korea .......................... 22373

[51] Int. Cl.$^5$ ............................................... H04N 1/40
[52] U.S. Cl. ..................................... 358/445; 358/447; 358/451; 382/47
[58] Field of Search ............... 358/401, 400, 404, 443, 358/444, 445, 447, 448, 451, 452, 459, 462, 75, 261.1; 382/47

[56] References Cited

U.S. PATENT DOCUMENTS

| | | | |
|---|---|---|---|
| 4,677,421 | 6/1987 | Taniyama | 358/261.1 |
| 4,742,399 | 5/1988 | Kitamura | 358/261.1 |
| 4,922,524 | 5/1990 | Baba et al. | 358/435 |
| 5,075,767 | 12/1991 | Takaragi | 358/75 |

*Primary Examiner*—Edward L. Coles, Sr.
*Assistant Examiner*—Jerome Grant, III
*Attorney, Agent, or Firm*—Robert E. Bushnell

[57] ABSTRACT

A resolution conversion method for securing a high quality of pictorial image by converting an pictorial image data of resolution of 200 dpi to an pictorial image data of resolution of 300 dpi so as to print without any deterioration or distortion of the quality of a picture and to prevent for a printer or a displaying device.

20 Claims, 6 Drawing Sheets

RESOLUTION CONVERSION METHOD OF PICTORIAL IMAGE PROCESSING SYSTEM

FIELD OF THE INVENTION

The present invention relates to a resolution conversion method of a pictorial image processing system, and more particularly to a resolution conversion method for converting pictorial image data of resolution of 200 dpi read by a scanner to pictorial image data of resolution of 300 dpi so that the converted pictorial image data is outputted to a printer and/or any displaying apparatus of resolution of 300 dpi.

TECHNICAL BACKGROUND OF THE INVENTION

Generally a pictorial image processing apparatus such as a facsimile adopts a heat sensitive recording method utilizing a thermal printer head element for recording a processed document. In the heat sensitive recording method, the record paper is expensive and has poor preservation of record even if black dots are expressed relatively well by using a special heat sensitive paper recorded by the thermal printer head. Recently a facsimile using a normal paper as a record paper is getting popular, and the facsimile using the normal paper adopts an electrophotographic method utilizing a LBP(laser beam printer) or LED(light emitting diode). However, a resolution is deteriorated owing to a quality of the normal paper and a minute detail is not expressed well in the electro-photographic method as compared with the heat sensitive recording method. Consequently a dark recorded paper is produced. Accordingly the facsimile using a normal paper should increase a resolution of its recording device more than a resolution of a manuscript scanner, and a number of data processed and transmitted to the recording device in proportion to the increased resolution. In 1980, Consultant Committee of International Telegraph & Telephone (hereinafter called as "CCITT") recommends that a scanner of G3 facsimile apparatus should have about 203 dots per inch (8 mm per character) for a horizontal resolution and about 196 dots per inch (7.7 mm per line of the character) for a vertical resolution. As compared with the recommendation of CCITT, a current recording device of the normal paper facsimile has normally a resolution of 300 dots per inch for a vertical and a horizontal directions. Accordingly the number of data to be recorded should be enlarged vertically and horizontally by 1.534 times. An pictorial image quality of an output is influenced by a method of magnification when the data to be recorded is magnified according to a change of resolution. A zero-order interpolation is used mostly for magnification because of simplicity of embodiment. As the zero-order interpolation repeats simply a pixel of every even number in a horizontal direction and a line of every even number in a vertical direction, the black dots are converted asymmetrically partially, and furthermore it is occurred often that the black dots are piled on one another. Consequently the zero-order interpolation may deteriorate greatly an pictorial image quality of half tone expressing an intensity by a distribution density of random discrete black dots in the same way of an error diffusion method.

There is disclosed a new magnification method utilizing a combination of logical product and sum so as to eliminate such problems as deterioration of pictorial image quality in the zero-order interpolation and to easily perform such a thing, when it is necessary to convert a resolution of the data to be recorded in a normal paper facsimile.

Figure 1:
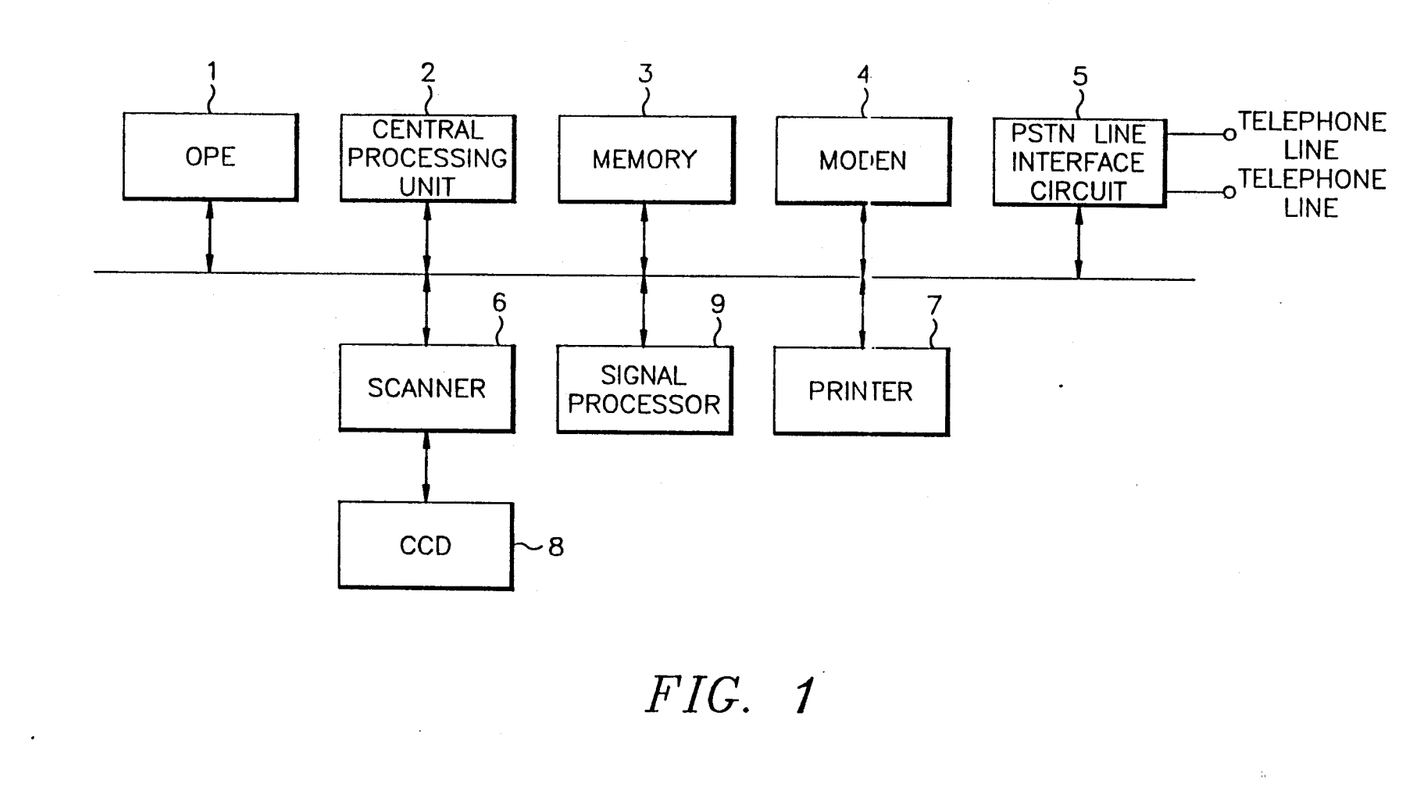
FIG. 1 shows a block diagram of a general facsimile.

With reference to FIG. 1, a configuration of conventional facsimile system is described as follows. A central processing unit 2 (hereinafter called as "CPU") controls a system according to a given program. A memory 3 stores program data, protocol data and character data, and accesses and/or stores the data by a control of the CPU 2. An operating panel equipment 1 comprises a plurality of keys for generating key data and a device for displaying data of the CPU, and transmits the key data to the CPU 2 if the key data is generated. A charge coupled device 8 (hereinafter called as "CCD") reads pictorial image data from a manuscript and performs a photoelectric conversion of the pictorial image data. A scanner 6 transmits the converted pictorial image data from the CCD 8 to the CPU 2. A modem 4 modulates output data of the CPU 2 into an analog and demodulates received analog data by a control of the CPU. A signal processor 9 decodes and/or encodes output pictorial image data from the scanner 6 and the modem 4. A PSTN line interface circuit 5 establishes a speech loop of a telephone line and interfaces the signal of the modem 4 with a signal of the telephone line by a control of the CPU 2. A printer 7 prints input data by a control signal of the CPU 2.

Figure 2:
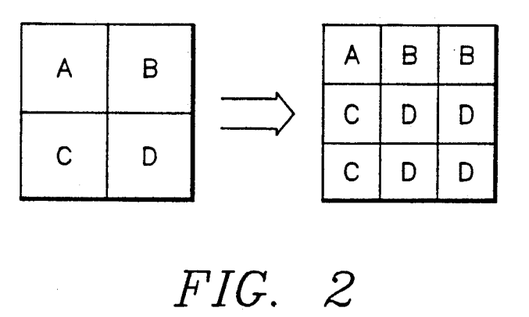
FIG. 2 shows an example of conventional conversion from resolution of 200 dpi to resolution of 300 dpi.
Figure 3A:
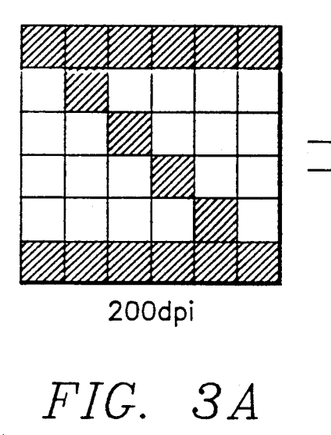
FIGS. 3A, 3B show an example of conventional pictorial image data conversion.
Figure 3B:
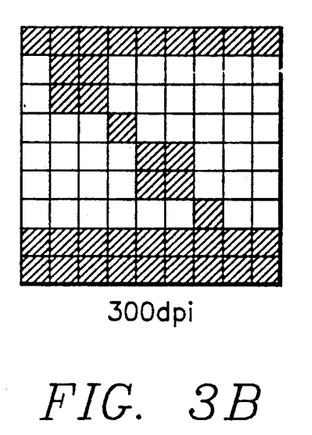

FIG. 2 illustrates an example of conventional conversion from a resolution of 200 dpi to a resolution of 300 dpi and FIGS. 3A, 3B illustrates an example of a conventional resolution conversion of pictorial image data.

With reference to FIGS. 1 to 3, a conventional resolution conversion method by a magnification utilizing the disclosed zero-order interpolation is described as follows. Pictorial image data of 200 dpi read by the CCD 8 or received from the modem 4 through the PSTN line interface circuit 5 is stored in the memory 3. With reference to FIG. 2, the CPU 2 converts a resolution of first line by writing a pixel of odd number once and writing a pixel of even number twice repeatedly in a horizontal direction (as shown in FIG. 2) after reading by two pixels of the pictorial image data of a first line at a time from the memory 3. After completing a resolution conversion of a first line, the CPU 2 performs a resolution conversion of a second line in the same way of processing the first line, and writes the second line of resolution conversion one more time repeatedly under the second line in a vertical direction. After finishing the resolution conversion, the converted pictorial image data is stored in the memory 3 and transmitted to the printer 7 for printing. By repeating such an operation, the CPU 2 converts an input pictorial image signal of resolution of 200 dpi as shown in FIG. 3A to pictorial image data of resolution of 300 dpi as shown in FIG. 3B by writing a pixel of even number twice repeatedly in a horizontal direction and a line of even number twice repeatedly in a vertical direction.

Since pictorial image data of resolution of 200 dpi is converted to pictorial image data of resolution of 300 dpi by writing twice repeatedly a pixel of even number in horizontal direction and a line of even number in vertical direction respectively, a horizontal and a vertical stripes are appeared, pictorial image quality is deteriorated, and pictorial input image signal is distorted.

SUMMARY OF THE INVENTION

It is an object of the present invention to provide a resolution conversion method for securing a high quality of pictorial image.

It is another object of the present invention to provide a resolution conversion method for converting pictorial image data of resolution of 200 dpi to pictorial image data of resolution of 300 dpi so as to print without deteriorating a quality of a picture in a facsimile.

It is still another object of the present invention to provide a resolution conversion method for converting pictorial image data of resolution of 200 dpi to pictorial image data of resolution of 300 dpi so as to prevent a distortion of an input pictorial image signal in a facsimile.

According to the present invention, a resolution conversion method of a pictorial image processing system comprises the steps of storing pictorial image data of two lines received as an unit of line in an odd and an even line of a two-line buffer, covering the pictorial image data stored in the two-line buffer with a mask by 2×2 pixels so as to prevent an overlapping one another, performing a resolution conversion by a logical operation after reading the pictorial image data covered by the mask in the second step and storing the converted pictorial image data in a three-line buffer, and recording the pictorial image data stored in the three-line buffer on a memory when the resolution conversion of two lines is finished, and repeating the above steps until all lines of the pictorial image data are recorded completely.

The present invention will now be described more specifically with reference to the drawings attached only by way of example.

DETAILED DESCRIPTION OF CERTAIN PREFERRED EMBODIMENTS

Pictorial image data of two lines received as an unit of line is stored each in an odd and an even line buffers of a two-line buffer. And the pictorial image data of the two-line buffer is covered with a mask by 2×2 pixels so as not to be overlapped one another. Thereafter a resolution is converted by a logical operation after reading the pictorial image data covered with a mask by 2×2 pixels, and the converted data is stored in a three-line buffer. The pictorial image data stored in the three-line buffer is transmitted to a memory when the resolution coversion of two lines is finished. The resolution coversion is performed by repeating the above operation until all lines of the pictorial image data is transmitted and recorded completely in the memory.

Figure 4:
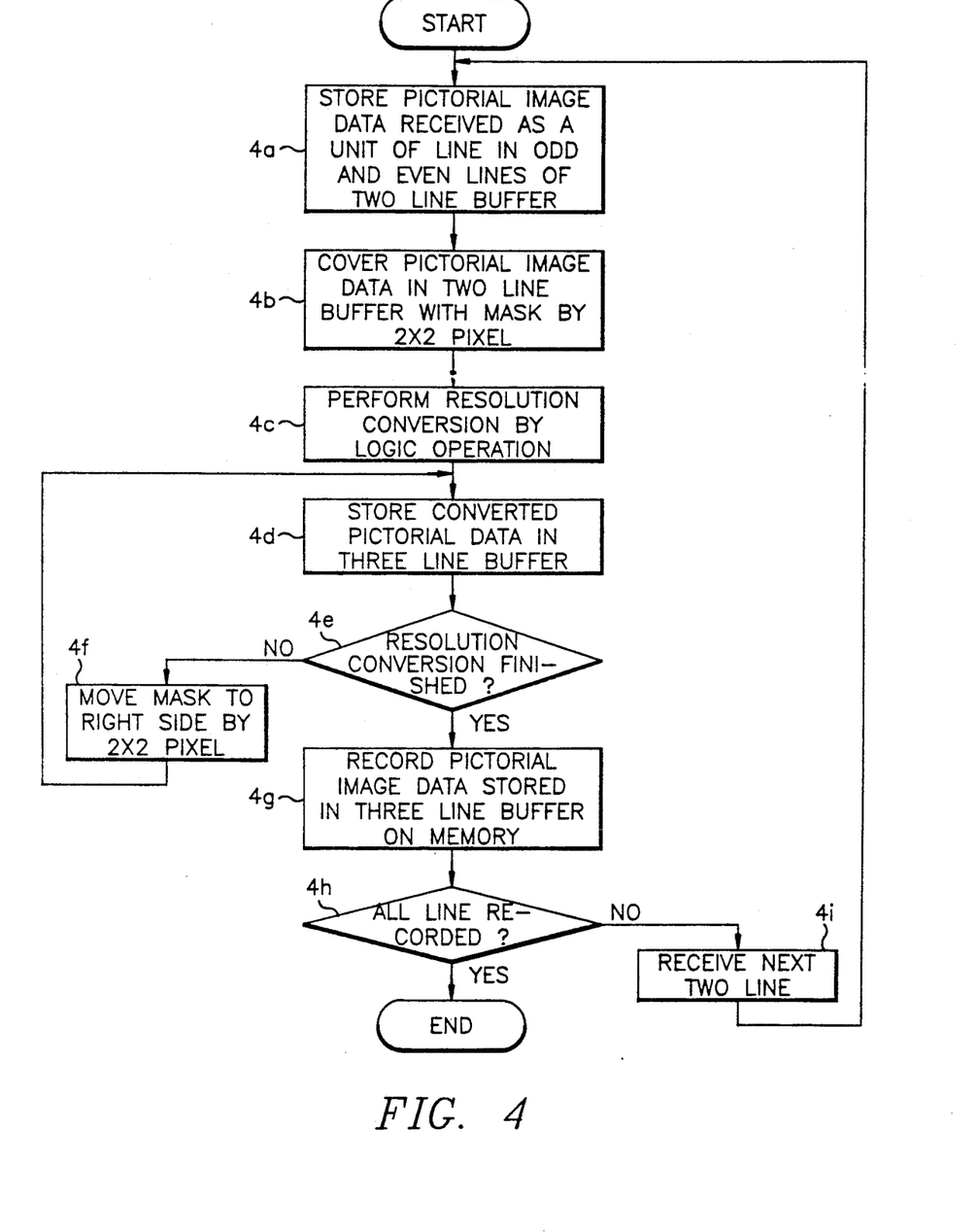
FIG. 4 shows a flowchart according to the present invention.

With reference to FIG. 4, pictorial image data of two lines is received as an unit of line and stored in an odd and an even line buffers of a two-line buffer in a first step. A given number of the pictorial image data stored in the two-line buffer are covered with a mask in a second step. A resolution of the pictorial image data covered by the mask is converted by a logical operation and the converted resolution is stored in a three-line buffer in a third step. In a fourth step, the above steps are repeated until all lines of the pictorial image are recorded completely in a memory, after recording the pictorial image data stored in the three-line buffer on a memory when the resolution conversion of the two lines is finished in the third step.

With reference to FIG. 1 and 4 to 8, an example of embodiment is described more specifically as follows.

Figure 6A:
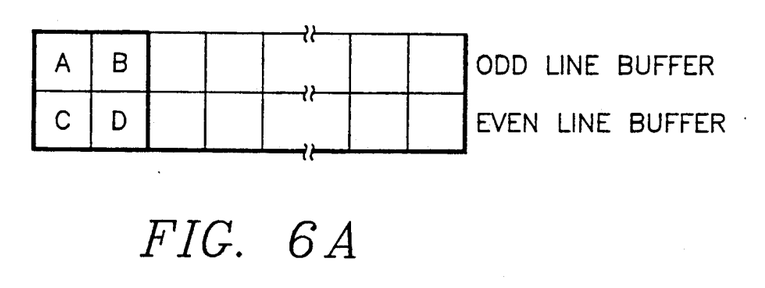
FIG. 6A, 6B show a view of pictorial image data covered with a 2×2 mask according to the present invention.
Figure 6B:
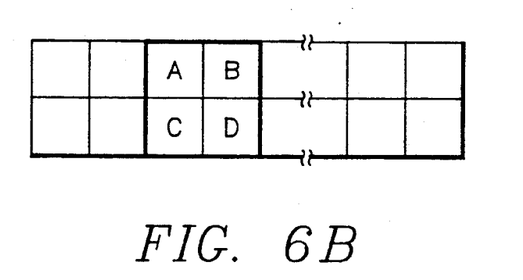
Figure 7A:
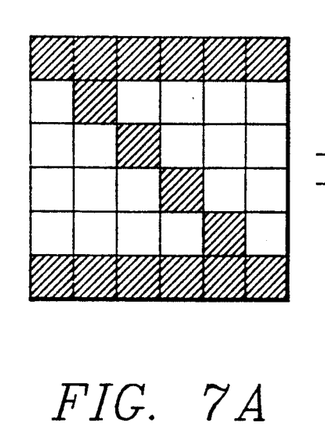
FIGS. 7A, 7B show an example of pictorial image data conversion of the present invention.
Figure 7B:
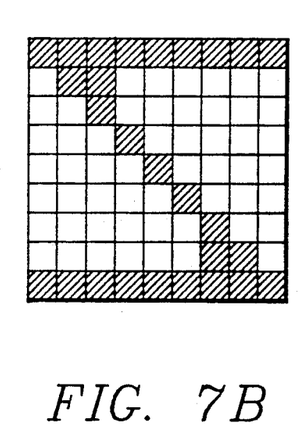

A configuration of the inventive facsimile system is the same one as shown in FIG. 1 and described more specifically as follows. A central processing unit 2 (hereinafter called as "CPU") receives pictorial image data of 200 dpi read as an unit of line by a CCD 8 or a modem 4 through a PSTN line interface unit 5, and reproduces and stores the pictorial image data in a two-line buffer after encoding or decoding the pictorial image data by a signal processor 9. At this time, the pictorial image data is binarization data as "black" or "white", and for example, the "black" is indicated as "1" and the "white" as "0, or vice versa "black" as "0" and "white" as "1". Hereby it is assumed that the "black" is "1" and the "white" is "0". The CPU 2 covers the two-line buffer with a mask by 2×2 pixels as shown in FIG. 6A. The CPU 2 reads the pictorial image data covered with the mask by 2×2 pixels as shown in FIG. 7A, and performs a resolution conversion of the pictorial image data into pictorial image data of 9 pieces by a logical operation as shown in FIG. 7B and stores the converted data in the memory 3. And the CPU 2 transmits the pictorial image data stored in the memory 3 to a printer 7 for printing.

Figure 5A:
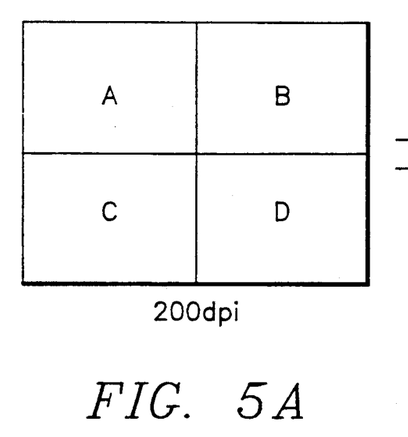
FIGS. 5A, 5B show an example of inventive conversion from resolution of 200 dpi to resolution of 300 dpi.
Figure 5B:
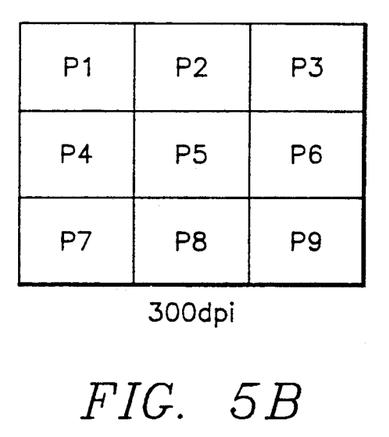

With reference to FIG. 4, the CPU 2 stores pictorial image data of 200 dpi received as an unit of line from a scanner 6 or a modem 4 and processed by a signal processor 9 in an odd and an even line buffers of a two-line buffer in a step of 4A. In a step of 4B, the pictorial image data of the odd and the even line buffers of the two-line buffer is covered with a 2×2 mask by 2×2 pixels so as not to be overlapped as shown in FIG. 6A. In a step of 4C, the pictorial image data of 2×2 pixels covered with the 2×2 mask (as shown in FIG. 5A) is read and converted to pictorial image data of 9 pieces as shown in FIG. 5B by a logical operation and thereby designating each pixel for the pictorial image data of 9 pieces. The pictorial image data of the 9 pieces is obtained as follows.

Figure 8A:
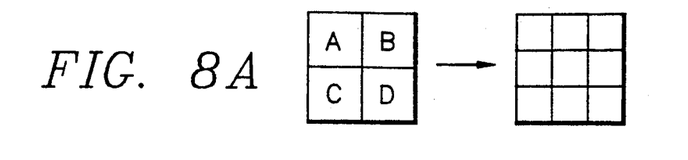
FIGS. 8A to 8P show examples of conversion of the present invention according to a state of pictorial image data.
Figure 8B:
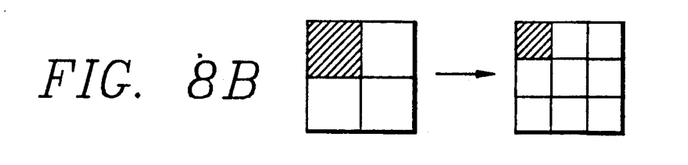
Figure 8C:
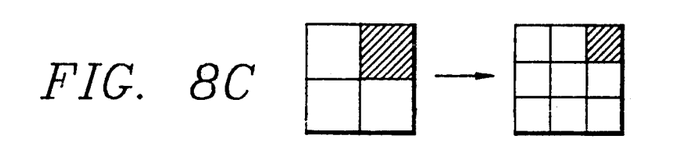
Figure 8D:
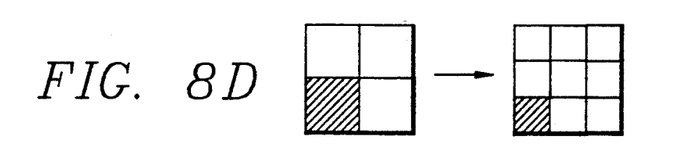
Figure 8E:
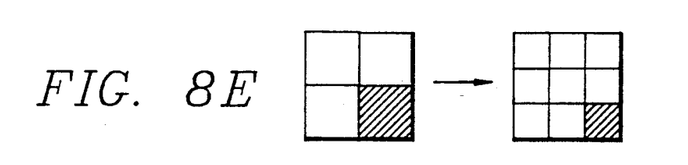
Figure 8F:
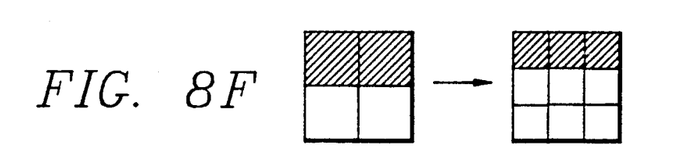
Figure 8G:
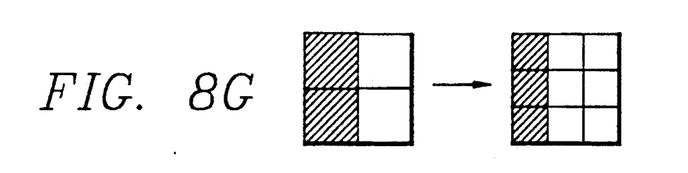
Figure 8H:
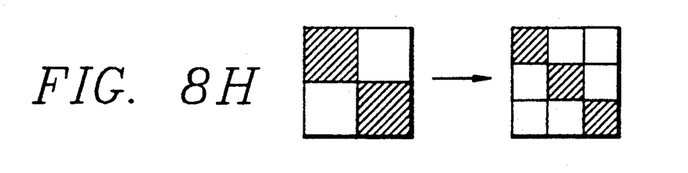
Figure 8I:
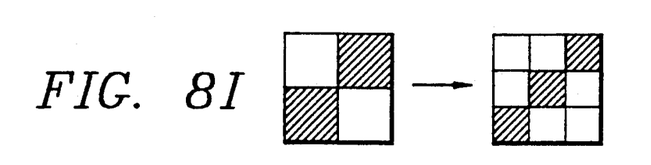
Figure 8J:
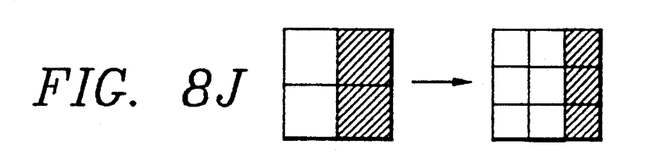
Figure 8K:
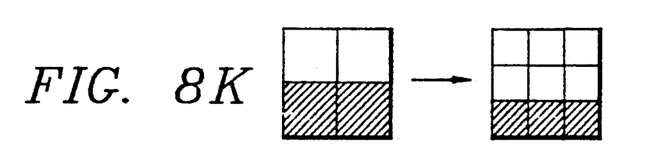
Figure 8L:
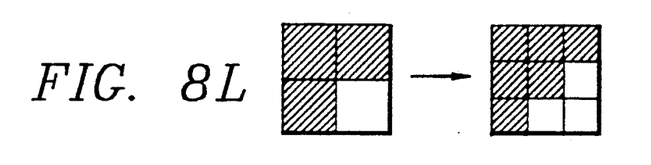
Figure 8M:
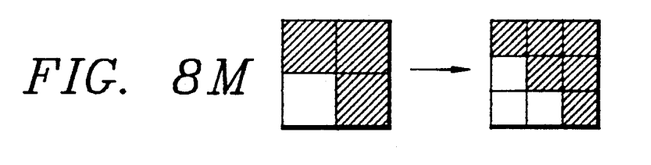
Figure 8N:
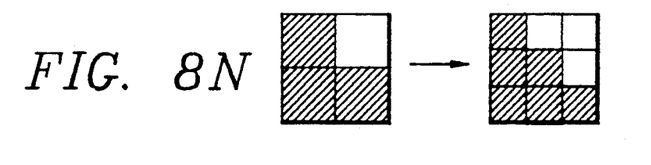
Figure 8O:
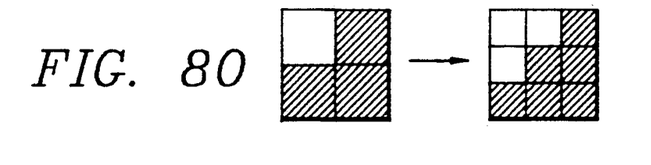
Figure 8P:
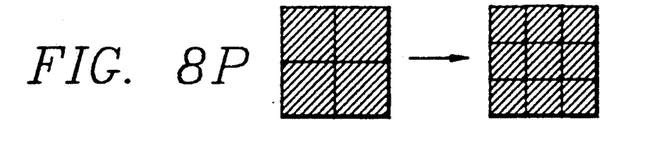

$P1 = A$  $P2 = A \times B$  $P3 = B$  $P4 = A \times C$  $P5 = (A \times D) + (B \times C)$
$P6 = B \times D$  $P7 = C$  $P8 = C \times D$  $P9 = D$ A resolution converted data according to a state of the pictorial image data of the two-line buffer covered with the 2×2 mask has one of 16 cases as shown in FIGS. 8A to 8P, and a truth table is as follows.

TABLE 1

| NO | A | B | C | D | P1 | P2 | P3 | P4 | P5 | P6 | P7 | P8 | P9 |
|----|---|---|---|---|----|----|----|----|----|----|----|----|----|
| 1  | 0 | 0 | 0 | 0 | 0  | 0  | 0  | 0  | 0  | 0  | 0  | 0  | 0  |
| 2  | 1 | 0 | 0 | 0 | 1  | 0  | 0  | 0  | 0  | 0  | 0  | 0  | 0  |
| 3  | 0 | 1 | 0 | 0 | 0  | 0  | 1  | 0  | 0  | 0  | 0  | 0  | 0  |
| 4  | 0 | 0 | 1 | 0 | 0  | 0  | 0  | 0  | 0  | 0  | 1  | 0  | 0  |
| 5  | 0 | 0 | 0 | 1 | 0  | 0  | 0  | 0  | 0  | 0  | 0  | 0  | 1  |
| 6  | 1 | 1 | 0 | 0 | 1  | 1  | 1  | 0  | 0  | 0  | 0  | 0  | 0  |
| 7  | 1 | 0 | 1 | 0 | 1  | 0  | 0  | 1  | 0  | 0  | 1  | 0  | 0  |
| 8  | 1 | 0 | 0 | 1 | 1  | 0  | 0  | 0  | 1  | 0  | 0  | 0  | 1  |
| 9  | 0 | 1 | 1 | 0 | 0  | 0  | 1  | 0  | 1  | 0  | 1  | 0  | 0  |
| 10 | 0 | 1 | 0 | 1 | 0  | 0  | 1  | 0  | 0  | 1  | 0  | 0  | 1  |
| 11 | 0 | 0 | 1 | 1 | 0  | 0  | 0  | 0  | 0  | 1  | 1  | 1  | 1  |
| 12 | 1 | 1 | 1 | 0 | 1  | 1  | 1  | 1  | 1  | 0  | 1  | 0  | 0  |
| 13 | 1 | 1 | 0 | 1 | 1  | 1  | 1  | 0  | 1  | 1  | 0  | 0  | 1  |
| 14 | 1 | 0 | 1 | 1 | 1  | 0  | 0  | 1  | 1  | 0  | 1  | 1  | 1  |
| 15 | 0 | 1 | 1 | 1 | 0  | 0  | 1  | 0  | 1  | 1  | 1  | 1  | 1  |
| 16 | 1 | 1 | 1 | 1 | 1  | 1  | 1  | 1  | 1  | 1  | 1  | 1  | 1  |

In the table 1, "1" stands for pictorial image data of "black" pixel and "0" stands for pictorial image data of "white" pixel. In a step of 4D, the resolution converted pictorial image data of the 9 pieces are stored in a three-line buffer so as not to be overlapped one another. In a step of 4E, it is checked whether the resolution conversion of the pictorial image data for the two lines is completed. If the resolution conversion of the pictorial image data for the two lines is not completed in the step of 4E, the mask is moved to a right side by 2×2 pixels so as to cover next 2×2 pixels in the two-line buffer without overlapping in a step of 4F, and the CPU 2 returns to the step of 4C. If the resolution conversion of pictorial image data for the two lines is completed in the step of 4E, the resolution converted pictorial image data of the two lines stored in the three-line buffer is recorded in a memory 3 in a step of 4G, and then a step of 4H is performed. In the step of 4H, it is checked whether all lines of the pictorial image data received are recorded completely or not, and if not, the next two lines of the pictorial image data are read and stored in the two-line buffer in a step of 4I, and the CPU 2 repeats the above steps after returning to the step of 4A. But if all lines of pictorial image data is recorded completely in the step of 4H, the resolution conversion process is finished.

Consequently a high quality of pictorial image is secured because a distortion of data from a telephone line is prevented and stripes of a vertical and a horizontal directions are not appeared by converting from resolution of the pictorial image data of 200 dpi of two lines received as an unit of line to resolution of pictorial image data of 300 dpi of three lines in pictorial image processing system such as a facsimile.

While the invention has been particularly shown and described with reference to the preferred embodiment of the present invention thereof, it will be understood by those skilled in the art that the foregoing and other changes in form and details may be made without departing from the spirit and scope of the present invention.

What is claimed is:

1. A resolution conversion method for a pictorial image processing system, comprising the steps of;
   storing pictorial image data received as an unit of line in an odd and an even line of a two-line buffer;
   sequentially covering said pictorial image data stored in said two-line buffer with a mask so as to prevent overlapping of one portion of said pictorial image data from another;
   reading said pictorial image data covered by said mask to perform a resolution conversion of said pictorial image data and storing the converted pictorial image data in a three-line buffer; and
   recording said converted pictorial image data stored in said three-line buffer on a memory when said resolution conversion for two lines of said pictorial image data stored in said two-line buffer is finished, and repeating all of said steps until all lines of said pictorial image data are recorded completely.

2. The resolution coversion method of pictorial image processing system as claimed in claim 1, wherein said resolution conversion is performed by the steps of;
   extracting said pictorial image data of odd and even rows of the odd line of said two-line buffer to sequentially produce first pixel data representative of odd row of the odd line, second pixel data representative of a logical product of data of odd and even rows of the odd line, and third pixel data representative of even row of the odd line;
   extracting said pictorial image data of odd and even rows of both of the odd and even lines of said two-line buffer to sequentially produce fourth pixel data representative of a logical product of data of odd rows of each of the even and odd lines, fifth pixel data representative of a logical sum of a logical product of data of odd row of the odd line and even row of the even line and a logical product of data of even row of the odd line and odd row of the even line, and sixth pixel data representative of a logical product of each data of even rows of odd and even lines; and
   extracting said pictorial image data of odd and even rows of the even line of said two-line buffer to sequentially produce seventh pixel data representative of odd row of the even line, eighth pixel data representative of a logical product of data of odd and even rows of the even line, and ninth pixel data representative of even row of the even line, wherein said first, second third, fourth, fifth, sixth, seventh, eight and ninth pixel data constitute said converted pictorial image data.

3. The resolution conversion method as claimed in claim 1, wherein said pictorial image data has a resolution of 200 dpi, and said converted pictorial image data has a resolution of 300 dpi.

4. The resolution conversion method as claimed in claim 1, wherein said mask is a 2×2 pixels mask.

5. The resolution conversion method as claimed in claim 1, wherein said resolution conversion is performed to convert the pictorial image data within the mask of 2×2 pixels into the converted pictorial image data of 3×3 pixels.

6. A resolution conversion method for a pictorial image processing system, comprising the steps of;
   receiving pictorial image data having a first resolution factor on a line-by-line basis;
   storing said pictorial image data in each line unit consisting of an odd line and an even line in a two-line buffer;
   sequentially covering different portions of said pictorial image data stored in each line unit with a mask of a predetermined size;

performing a resolution conversion of said pictorial image data by reading the portion of said pictorial image data covered by said mask to convert said portion of said pictorial image data of said first resolution factor into converted pictorial image data having a second resolution factor greater than said first resolution factor, and storing the converted pictorial image data in a three-line buffer; and recording the converted pictorial image data into a memory when the resolution conversion of said pictorial image data in each line unit is completed.

7. The resolution conversion method as claimed in claim 6, further comprising a step of repeating the resolution conversion of the pictorial image data for each line unit consisting of said odd line and said even line until all line units of said pictorial image data are recorded.

8. The resolution conversion method as claimed in claim 6, wherein said first resolution factor is 200 dpi, and said second resolution factor is 300 dpi.

9. The resolution conversion method as claimed in claim 6, wherein said predetermined size of the mask is 2×2 pixels.

10. The resolution conversion method as claimed in claim 9, wherein said resolution conversion is performed to convert the pictorial image data within said mask into the converted pictorial image data of 3×3 pixels.

11. The resolution conversion method of pictorial image processing system as claimed in claim 6, wherein said resolution conversion is performed by the steps of;

extracting said pictorial image data of odd and even rows of the odd line to sequentially produce first pixel data representative of odd row of the odd line, second converted data representative of a logical product of data of odd and even rows of the odd line, and third pixel data representative of even row of the odd line;

extracting said pictorial image data of odd and even rows of the odd and even lines to sequentially produce fourth pixel data representative of a logical product of data of odd rows of the even and odd lines, fifth pixel data representative of a logical sum of a logical product of data of odd row of the odd line and even row of the even line and a logical product of data of even row of the odd line and odd row of the even line, and sixth pixel data of a logical product of each data of even rows of odd and even lines; and extracting said pictorial image data of odd and even rows of the even line to sequentially produce seventh pixel data representative of odd row of the even line, eighth pixel data representative of a logical product of data of odd and even rows of the even line, and ninth pixel data representative of even row of the even line, wherein said first, second, third, fourth, fifth, sixth, seventh, eighth and ninth pixel data constitute said converted pictorial image data.

12. A resolution conversion apparatus of a pictorial image processing system, comprising;

means for receiving pictorial image data having a first resolution factor on a line-by-line basis from one of a scanner and a modem;

processor means having a two-line buffer, a three-line buffer and a memory, for storing each line unit consisting of an odd line and an even line of said pictorial image data in said two-line buffer, sequentially covering different portions of said pictorial image data stored as said line unit with a mask of a predetermined size, performing a resolution conversion of said pictorial image data by reading each portion of said pictorial image data covered by said mask to convert said pictorial image data of said first resolution factor into converted pictorial image data having a second resolution factor greater than said first resolution factor, storing the converted pictorial image data into said three-line buffer, and recording the converted pictorial image data into a memory when the resolution conversion of said pictorial image data as said line unit are completed;

means for enabling transmission of said converted pictorial image data having said second resolution factor to a printer for performing a printing operation.

13. The resolution conversion apparatus as claimed in claim 12, wherein said processor means further repeats the resolution conversion of the pictorial image data for each line unit consisting of said odd line and said even line until all line units of said pictorial image data are recorded.

14. The resolution conversion apparatus as claimed in claim 12, wherein said first resolution factor is 200 dpi, and said second resolution factor is 300 dpi.

15. The resolution conversion apparatus as claimed in claim 12, wherein said predetermined size of the mask is 2×2 pixels.

16. The resolution conversion apparatus as claimed in claim 15, wherein said resolution conversion is performed to convert the pictorial image data within the mask of 2×2 pixels into the converted pictorial image data of 3×3 pixels.

17. An image resolution conversion apparatus, comprising;

means for receiving pictorial image data having a first resolution factor on a line-by-line basis;

first buffer means for storing said pictorial image data in sequence of a two-line unit;

means for sequentially masking different portions of the two-line unit of said pictorial image data stored in said first buffer means, and performing a resolution conversion of said pictorial image data within each masking portion to produce converted pictorial image data having a second resolution factor greater than said first resolution factor; and second buffer means for storing the converted pictorial image data in sequence of a three-line unit.

18. The image resolution conversion apparatus as claimed in claim 17, further comprising means for repeating the resolution conversion of the pictorial image data for each of the two-line unit until all of said two-line unit are recorded.

19. The image resolution conversion apparatus as claimed in claim 18, wherein said first resolution factor is 200 dpi, and said second resolution factor is 300 dpi.

20. The image resolution conversion apparatus as claimed in claim 17, wherein each masking portion of said pictorial image data covers 2×2 pixels, and said pictorial image data within each masking portion is converted into the converted pictorial image data of 3×3 pixels.

* * * * *

UNITED STATES PATENT AND TRADEMARK OFFICE
CERTIFICATE OF CORRECTION

PATENT NO. : 5,327,256

DATED : 5 July 1994

INVENTOR(S) : Ku-Su Kang and Seo-Kyu Kim

It is certified that error appears in the above-indentified patent and that said Letters Patent is hereby corrected as shown below:

Change "an" (first occurrence) to --a--, and         Change "an" (second occurrence) to --a--.

Column 1,    line 17, after "Generally" insert --,--;

line 25, after "Recently" insert --,--;

line 33, after "Consequently" insert --,--;

line 50, change "An" to --A--, and               line 62, change "an" to --a--.

Column 2,    line 32, change "illustrates" to --illustrate--.

Column 3,    line 60, change "And the" to --The--.

Column 5,    line 45, change "is" to --are--.

UNITED STATES PATENT AND TRADEMARK OFFICE
CERTIFICATE OF CORRECTION

PATENT NO. : 5,327,256

DATED : 5 July 1994

INVENTOR(S) : Ku-Su Kang and Seo-Kyu Kim

It is certified that error appears in the above-indentified patent and that said Letters Patent is hereby corrected as shown below:

Column 7, line 62, change ";" to --:--.

Column 8, line 39, change ";" to --:--.

Signed and Sealed this

Third Day of October, 1995

Attest:

BRUCE LEHMAN

*Attesting Officer*   *Commissioner of Patents and Trademarks*